US012726406B2

(12) United States Patent
Artemenko et al.

(10) Patent No.: US 12,726,406 B2
(45) Date of Patent: Sep. 1, 2026

(54) METHOD AND DEVICE FOR OPERATING A COMMUNICATION SYSTEM FOR OPTIMIZING PARAMETERS OF THE COMMUNICATION SYSTEM

(71) Applicant: Robert Bosch GmbH, Stuttgart (DE)

(72) Inventors: Alexander Artemenko, Ehningen (DE); Henrik Klessig, Renningen (DE); Johannes Von Hoyningen-Huene, Mielkendorf (DE); Steven Dietrich, Langenau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 281 days.

(21) Appl. No.: 18/557,383

(22) PCT Filed: Jun. 27, 2022

(86) PCT No.: PCT/EP2022/067526
§ 371 (c)(1),
(2) Date: Oct. 26, 2023

(87) PCT Pub. No.: WO2023/285121
PCT Pub. Date: Jan. 19, 2023

(65) Prior Publication Data

US 2024/0214268 A1 Jun. 27, 2024

(30) Foreign Application Priority Data

Jul. 16, 2021 (DE) ..................... 10 2021 207 634.3

(51) Int. Cl.
*H04W 4/00* (2018.01)
*H04L 1/00* (2006.01)
(Continued)

(52) U.S. Cl.
CPC ........ *H04L 41/0836* (2013.01); *H04L 1/0003* (2013.01); *H04L 41/16* (2013.01)

(58) Field of Classification Search
CPC ... H04L 41/0836; H04L 1/0003; H04L 41/16; H04L 1/0009; H04L 43/55;
(Continued)

(56) References Cited

U.S. PATENT DOCUMENTS 6,931,022 B1 8/2005 Sanders et al.
2002/0069038 A1 6/2002 Cooper
(Continued)

FOREIGN PATENT DOCUMENTS

BR PI0514882 A 6/2008
CN 111082467 A 4/2020
(Continued)

OTHER PUBLICATIONS

International Search Report for PCT/EP2022/067526, Issued Oct. 31, 2022.

(Continued)

*Primary Examiner* — Omoniyi Obayanju
(74) *Attorney, Agent, or Firm* — NORTON ROSE FULBRIGHT US LLP

(57) ABSTRACT

A method and a device for operating a communication system for optimizing parameters of a configuration of the communication system.

14 Claims, 3 Drawing Sheets

(51) Int. Cl.
*H04L 41/0823* (2022.01)
*H04L 41/16* (2022.01)

(58) Field of Classification Search
CPC ............. H04L 43/0829; H04L 43/0858; H04L 43/087; H04L 43/0811
See application file for complete search history.

(56) References Cited

U.S. PATENT DOCUMENTS

| | | | | |
|---|---|---|---|---|
| 2015/0010153 | A1 | 1/2015 | Robertson | |
| 2020/0287639 | A1 | 9/2020 | Su et al. | |
| 2022/0022245 | A1 * | 1/2022 | Dudda | H04W 72/23 |

FOREIGN PATENT DOCUMENTS

| | | | |
|---|---|---|---|
| EP | 3697041 | A1 | 8/2020 |
| GB | 2588811 | A | 5/2021 |

OTHER PUBLICATIONS

Wang et al., “Computation Offloading in Multi-Access Edge Computing Using a Deep Seuential Model Based on Reinforcement Learning,” IEEE Communications Magazine, vol. 57, No. 5, 2019, pp. 64-69. <https://sci-hub.ru/10.1109/mcom.2019.1800971> Downloaded Oct. 20, 2023.

Kim et al., “Probing-Based Link Adaptation for High Data Rate Wireless LANs,” IEEE Transactions on Wireless Communications, vol. 11, No. 7, 2012, pp. 2382-2390. <https://sci-hub.ru/10.1109/twc.2012.051512.110988> Downloaded Oct. 20, 2023.

Nokia et al., “Clarification on Kpis,” 3GPP TSG-SA WG1 Meeting #88; S1-193133, 3rd Generation Partnership Project (3GPP), Mobile Competence Centre, 2019, pp. 1-5. <https://ftp.3gpp.org/ tsg_sa/WG1_Serv/TSGS1_88_Reno/Docs/S1-193133.zipS1-193133FS_eCAVclause4.doc>.

* cited by examiner

METHOD AND DEVICE FOR OPERATING A COMMUNICATION SYSTEM FOR OPTIMIZING PARAMETERS OF THE COMMUNICATION SYSTEM

FIELD

The present invention relates to a method and a device for operating a communication system for optimizing parameters of a configuration of the communication system.

BACKGROUND INFORMATION

Machine learning methods for optimizing parameters are, for example, conventional in the related art. Ascertaining an optimal transmission configuration of a communication system is known to be a problem requiring a decision based on multiple criteria. In the field of machine learning, several methods are available for ascertaining an optimal parameter set, even in the case of a multitude of different criteria in which a corresponding degree of quality assumes a value that is as optimal as possible. Deep reinforcement learning and deep neural networks are novel methods of machine learning theory suitable for scenarios with very large parameter and state spaces. This is described, by way of example, in J. Wang, J. Hu, G. Min, W. Zhan, Q. Ni, and N. Georgalas; "Computation offloading in multi-access edge computing using a deep sequential model based on reinforcement learning;" IEEE Communications Magazine, 57(5): 64-69, May 2019. These methods treat the communication system like a black box and learn optimal parameter sets by observation. In this case, it is not necessary to model system dynamics.

An object of the present invention is to provide a method that enables parameters to be checked and optimized.

SUMMARY

One example embodiment of the present invention relates to a method for operating a communication system comprising at least two communication subscribers, wherein the at least two communication subscribers periodically exchange data with one another in transmission cycles, wherein the method comprises the following steps:

- providing a first set of parameter sets comprising at least one parameter set to be checked, and providing a second set of parameter sets comprising at least one safe parameter set;
- ascertaining a number of remaining non-critical transmission cycles;
- selecting parameter sets to be checked from the first set of parameter sets for application in a respective non-critical transmission cycle, and selecting a safe parameter set from the second set of parameter sets for application in a critical transmission cycle, and applying a configuration according to the selected parameter set in a respective transmission cycle.

The at least two communication subscribers exchange data wirelessly with one another via radio. In time-critical applications, data are periodically exchanged between the components involved. The duration of a transmission cycle in this case refers to the duration between two data transmissions of the same type. The transmission between the components involved must in this case take place within particular time windows. If successful data transmission does not occur by the expected point in time, the communication layer appears to be disrupted from the perspective of the application. However, in many time-critical applications, a faulty transmission cycle does not immediately result in an error state. Time-critical applications can usually tolerate a certain time period, such as one or even several transmission cycles in which the communication layer is unavailable, before the application itself also transitions into the error state. The method according to the present invention makes use of this property by ascertaining a number of remaining non-critical transmission cycles.

The method according to an example embodiment of the present invention makes it possible to check parameter sets to be checked, during the execution of applications, in particular time-critical applications. Because a parameter set to be checked is applied during a non-critical transmission cycle, it is possible to perform the check during the runtime of time-critical applications, without compromising the execution of the application.

With the method according the an example embodiment of the present invention, it is possible to continuously optimize the parameters for a configuration of the communication system, for example in order to adapt to changing channel conditions, without this optimization resulting in an increased probability of failure of a critical application.

For this reason, it is advantageous to hold a first set, for example comprising a particular number N1 of parameter sets to be checked, in a memory. These parameter sets can then be applied and thus checked during non-critical transmission cycles.

In communication systems with radio-based data exchange with moving communication subscribers and/or a changing environment, an optimal parameter set may change over time. It is thus possible for parameters that have resulted in a high, in particular the best, communication quality in the past to no longer represent the optimal parameter combination at the current point in time, but rather for another parameter combination to represent a better, in particular the best, configuration.

For this reason, according to an example embodiment of the present invention, it is advantageous to hold a second set, for example comprising a particular number N2 of safe parameter sets, in particular together with their quality values, in a memory, which safe parameter sets have resulted in good, in particular the best, transmission properties in a particular period of time in the more recent past. These safe parameter sets can then be applied during critical transmission cycles during which successful transmission must take place in order to prevent the application from transitioning into an error state.

According to an example embodiment of the present invention, advantageously, when ascertaining the number of remaining non-critical transmission cycles, a survival time of the data exchange between the two communication subscribers is taken into account. Survival time refers to the time period between a failure or disruption of the communication, i.e., a faulty transmission, and a failure or disruption of the application, i.e., an error state of the application. A typical value for the survival time is a time period that is generally greater than the time period of a transmission cycle. In this case, a single transmission error thus results in a brief failure of the communication layer, but if the following transmission is successful again, the communication layer is available again before the survival time elapses, and the application can be executed without errors. The survival time of the data exchange is, for example, taken into account in such a way that the number of remaining non-critical transmission cycles is ascertained, wherein the number of non-critical transmission cycles is the number of transmission cycles in which the survival time counted from the current transmission cycle is not exceeded.

The method according to the present invention thus enables continuous checking and thus optimization of parameters of a communication system, taking into account the survival time of a time-critical application. With the present invention, it is possible to adapt the communication system to changing channel conditions, without this optimization resulting in an increased probability of exceeding the "survival time" of a time-critical application.

According to one example embodiment of the present invention, a number of M or M−1 non-critical transmission cycles is ascertained for a survival time with M times the duration of a transmission cycle. The consideration of parameter set optimization during a non-critical transmission cycle can thus be extended to M non-critical transmission cycles if the survival time corresponds to at least M times the cycle time. Alternatively, the last cycle before the survival time elapses can already be determined as a critical transmission cycle so that a number of M−1 non-critical transmission cycles results.

According to one example embodiment of the present invention, it is provided that the method furthermore comprises: receiving information relating to the data exchange between the two communication subscribers and comprising at least one or more of the following items of information:

a cycle time TC, and/or information about the communication subscribers, and/or a survival time TS, and/or information about an amount of data.

The items of information, also referred to as communication requirements, are, for example, transmitted by an application, in particular by a communication subscriber executing the application. On the basis of this information, the maximum possible or alternatively another appropriate number of non-critical transmission cycles can then be ascertained for each communication subscriber. For example, the number of non-critical cycles can be calculated via M=floor (TS/TC) with survival time TS and cycle time TC.

In current communication systems, there are a multitude of parameters that can affect the transmission properties and the quality of the transmission depending on the channel condition. For example, the parameters of a parameter set may include, but are not limited to, parameters of one or more of the following characteristic variables:

frequency channel/band, and/or modulation method, and/or transmission error correction encoding, and/or antenna configuration and/or antenna orientation, and/or transmit power, and/or beam forming properties, in particular lobe width and/or lobe direction, and/or redundant channels, and/or handover parameters.

According to one example embodiment of the present invention, it is provided that a quality value for the applied parameter set is ascertained for a data exchange in a transmission cycle. The quality value describes the success of a data exchange. The higher a quality value is, the safer is a parameter set.

A quality value is, for example, dependent on one or more of the following characteristic variables:

a packet error probability (packet error ratio, PER), and/or a bit error probability (bit error ratio, BER), and/or signal-to-noise ratio (SNR), and/or an end-to-end latency between the transmitter and the receiver, and/or jitter According to an example embodiment of the present invention, it can advantageously be provided that the method furthermore comprises: quantifying an influence of a configuration on the communication system. A configuration of a data exchange can also affect the communication system as a whole. One example is the spectral efficiency of the communication system, which in turn has an influence on the total data rate that can be transmitted in the communication system.

According to one example embodiment of the present invention, the communication system comprises more than two communication subscribers, and the number of remaining non-critical transmission cycles is ascertained based on a minimum subscriber-specific number of non-critical transmission cycles. It is possible that M is subscriber-specific. Since parameter set changes generally affect the communication of all subscribers, the number of non-critical cycles for the overall system can be derived from the minimum subscriber-specific number of non-critical cycles.

According to one example embodiment of the present invention, it is provided that the selection of parameter sets is based on a heuristic method or on a method comprising machine learning. Machine learning can be applied in order to provide the best possible estimate of the quality value as a function of the parameter set to be applied. Methods such as reinforcement learning, deep reinforcement learning and deep neural networks have been found to provide reliable results for the scenarios with large and very large parameter and state spaces despite strict time requirements.

A parameter set to be checked is, for example, an old parameter set that was applied a particular number of transmission cycles and/or a particular time duration ago, or a new parameter set that has not yet been applied.

According to one example embodiment of the present invention, it is provided that the method furthermore comprises a step of assigning a parameter set to the first set of parameter sets comprising parameter sets to be checked, or to the second set of parameter sets comprising safe parameter sets. For example, an old parameter set that was applied a particular number of transmission cycles and/or a particular time duration ago but was classified as a safe parameter set a certain time ago can be removed from the second set and assigned to the first set after a certain time and/or a certain number of transmission cycles has elapsed. This is expedient for trying good configurations again and again and determining and, if necessary, updating their current communication quality. Furthermore, after successful data exchange, an applied parameter set to be checked can be classified as a safe parameter set.

According to one example embodiment of the present invention, it is provided that the method comprises a step of creating parameter sets to be checked, in particular new parameter sets. Creating can, in particular, comprise machine learning. New parameter sets are, for example, based on a variation of safe parameter sets.

Further embodiments of the present invention relate to a device for operating a communication system comprising at least two communication subscribers, wherein the device is designed to perform steps of the method according to the described embodiments.

The present invention described herein can be used in time-critical applications in which individual packet failures can be tolerated, but multiple errors must be avoided at all costs. This is in particular the case in industrial applications and/or in motor vehicles, in particular in autonomous or semi-autonomous motor vehicles. The present invention is in particular suitable for cases where time-critical applications that have a multitude of parameters and whose optimum cannot simply be analytically ascertained communicate by means of communication systems. A further example are communication systems based on mobile radio, in particular of the 5th generation (5G) and/or subsequent generations.

Further features, possible applications and advantages of the present invention emerge from the description below of exemplary embodiments of the present invention, which are illustrated in the figures. All described or depicted features by themselves or in any combination constitute the subject matter of the present invention, regardless of their formulation or representation in the description or in the figures.

DETAILED DESCRIPTION OF EXAMPLE EMBODIMENTS

Figure 1:
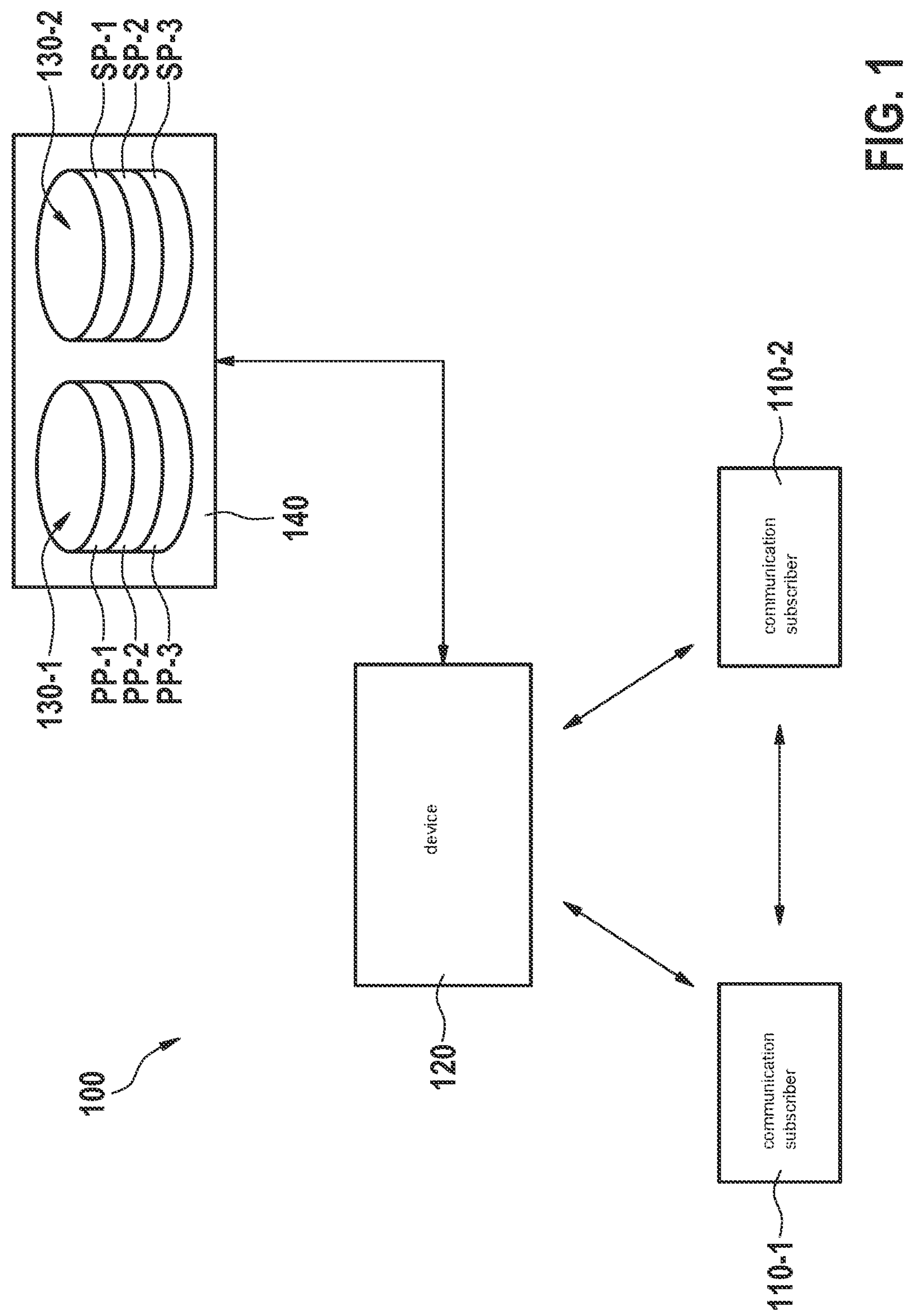
FIG. 1 shows a schematic representation of a communication system according to an exemplary embodiment of the present invention.

A communication system 100 is schematically shown in FIG. 1. The communication system is a 5G system, for example. With the characteristic "ultra reliability low latency communication" (uRLLC), it is possible in 5G systems to ensure short transmission latencies and thus short communication cycle times. In the 5G context, the parameter of a survival time is available as a parameter.

By way of example, the communication system 100 comprises two communication subscribers 110-1 and 110-2 and a device 120, in particular a higher-level unit, for operating the communication system 100.

For example, the two communication subscribers 110-1 and 110-2 execute a time-critical application or are involved in executing the time-critical application. This means that the data exchange between the two communication subscribers 110-1 and 110-2 takes place periodically. The duration of a transmission cycle in this case refers to the duration between two data transmissions of the same type. The transmission between the two communication subscribers 110-1 and 110-2 must in this case take place within particular time windows. If successful data transmission does not occur by the expected point in time, the communication layer appears to be disrupted from the perspective of the application. However, in many time-critical applications, a faulty transmission cycle does not immediately result in an error state. Time-critical applications can usually tolerate a certain time period, such as one or even several transmission cycles in which the communication layer is unavailable, before the application itself also transitions into the error state. This time period is also referred to as survival time, i.e., the time period between a failure or disruption of the communication, i.e., a faulty transmission, and a failure or disruption of the application, i.e., an error state of the application. A typical value for the survival time is a time period that is generally greater than the time period of a transmission cycle. In this case, a single transmission error thus results in a brief failure of the communication layer, but if the following transmission is successful again, the communication layer is available again before the survival time elapses, and the application can be executed without errors.

Figure 2:
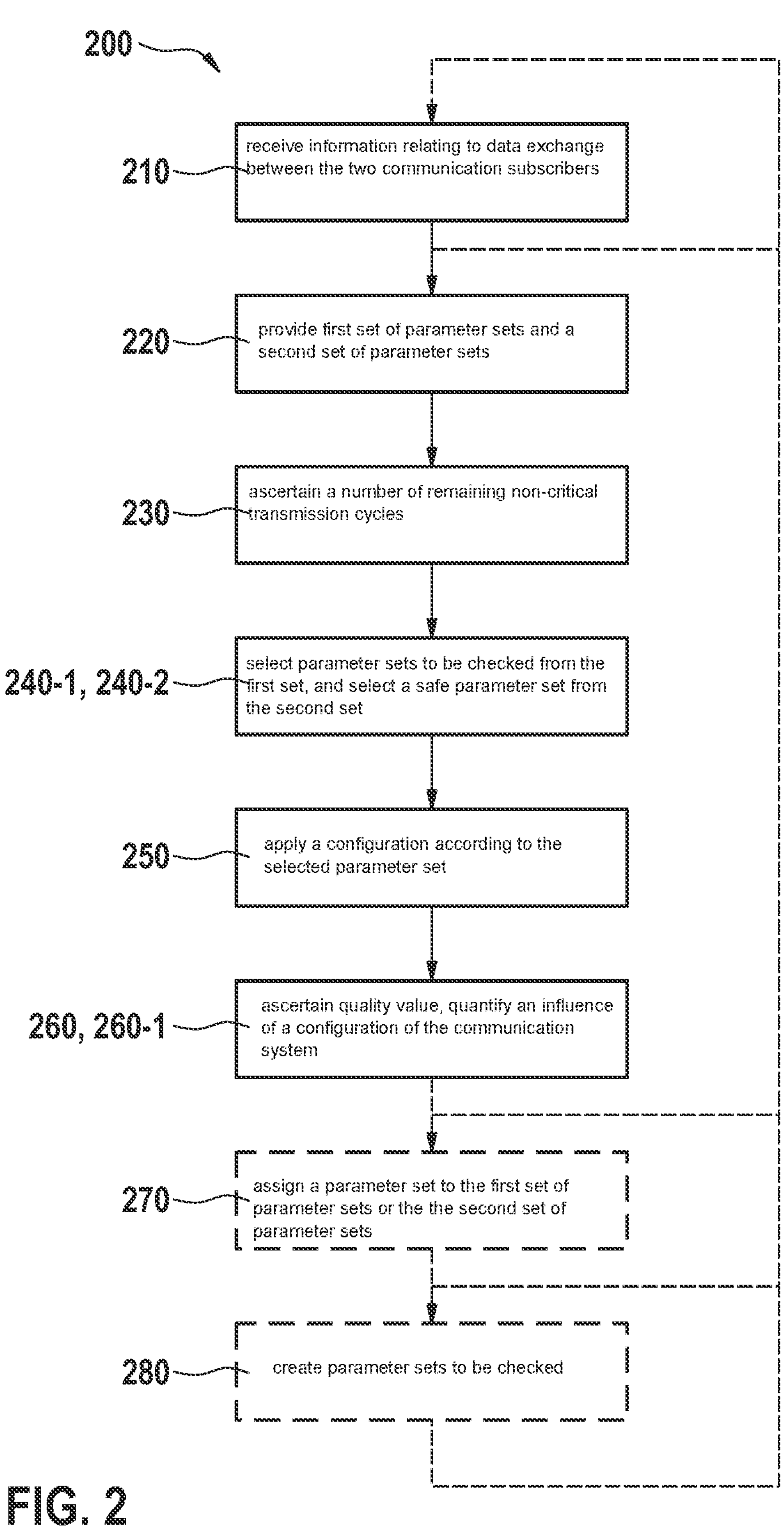
FIG. 2 shows steps of a method for operating a communication system of FIG. 1, according to an example embodiment of the present invention.

Further aspects are explained with reference to FIG. 2. The shown order of the method steps is exemplary. The steps can also be performed in a different order and/or partially simultaneously.

According to one embodiment, it is provided that a method 200 for operating the communication system 100 comprises:

receiving 210 information relating to the data exchange between the two communication subscribers 110-1, 110-2 and comprising at least one or more of the following items of information:
- a cycle time TC, and/or
- information about the communication subscribers, and/or
- a survival time TS, and/or
- information about an amount of data.

The items of information, also referred to as communication requirements, are, for example, transmitted to the device 120 by an application, in particular by the communication subscriber (s) 110-1, 110-2 executing the application.

The method 200 furthermore comprises a step 220 of providing a first set 130-1 of parameter sets comprising at least one parameter set PP, PP-1 to be checked, and providing a second set 130-2 of parameter sets comprising at least one safe parameter set SP, SP-1.

The first set 130-1 and the second set 130-2 of parameter sets are, for example, provided by the device 120. According to FIG. 1, the device 120 includes access to a memory device 140. The first set 130-1 of parameter sets is stored in the memory device, wherein the first set 130-1 comprises, by way of example, three parameter sets PP-1, PP-2 and PP-3 to be checked. The second set 130-2 of parameter sets is also stored in the memory device, wherein the second set 130-2 comprises, by way of example, three safe parameter sets SP-1, SP-2 and SP-3.

A safe parameter set is, for example, a reliable parameter set whose configuration leads to a successful data exchange with a pretty high certainty.

For a parameter set to be checked, the probability of whether the configuration thereof leads to a successful data exchange is not necessarily known. A parameter set to be checked is, for example, an old parameter set that was applied a particular number of transmission cycles and/or a particular time duration ago, or a new parameter set that has not yet been applied.

For example, the parameters of a parameter set may include, but are not limited to, parameters of one or more of the following characteristic variables:
- frequency channel/band, and/or
- modulation method, and/or
- transmission error correction encoding, and/or
- antenna configuration and/or antenna orientation, and/or
- transmit power, and/or
- beam forming properties, in particular lobe width and/or lobe direction, and/or
- redundant channels, and/or
- handover parameters.

In a further step 230 of the method 200, a number of remaining non-critical transmission cycles is ascertained. For example, the survival time TS is taken into account in ascertaining 230. The survival time TS of the data exchange is, for example, taken into account in such a way that the number of remaining non-critical transmission cycles is ascertained, wherein the number of non-critical transmission cycles is the number of transmission cycles in which the survival time counted from the current transmission cycle is not exceeded. For example, the number M of non-critical cycles can be calculated via M=floor (TS/TC) with survival time TS and cycle time TC.

The method furthermore comprises a step of selecting 240-1 parameter sets PP to be checked from the first set 130-1 of parameter sets for application in a respective non-critical transmission cycle, and selecting 240-2 a safe parameter set SP from the second set 130-2 of parameter sets for application in a critical transmission cycle.

According to one embodiment, it is provided that the selection 240-1, 240-2 of parameter sets is based on a heuristic method or on a method comprising machine learning. Machine learning can be applied in order to provide the best possible estimate of the quality value as a function of the parameter set to be applied. Methods such as reinforcement learning, deep reinforcement learning and deep neural networks have been found to provide reliable results for the scenarios with large and very large parameter and state spaces despite strict time requirements.

The method 200 furthermore comprises applying 250 a configuration according to the selected parameter set in a respective transmission cycle.

The method 200 makes it possible to check parameter sets PP to be checked, during the execution of applications, in particular time-critical applications. Because a parameter set PP to be checked is applied during a non-critical transmission cycle, it is possible to perform the check during the runtime of time-critical applications, without compromising the execution of the application.

With the method, it is possible to continuously optimize the parameters for a configuration of the communication system, for example in order to adapt to changing channel conditions, without this optimization resulting in an increased probability of failure of a critical application.

For this reason, the first set 130-1, comprising a particular number N1 of parameter sets PP to be checked, is held in the memory 140. These parameter sets PP can then be applied during non-critical transmission cycles and thus checked.

In communication systems 100 with radio-based data exchange with moving communication subscribers 110-1, 110-2 and/or a changing environment, an optimal parameter set may change over time. It is thus possible for parameters that have resulted in a high, in particular the best, communication quality in the past to no longer represent the optimal parameter combination at the current point in time, but rather for another parameter combination to represent a better, in particular the best, configuration.

Furthermore, the second set 130-2, comprising a particular number N2 of safe parameter sets SP, in particular together with the quality values thereof, is held in the memory 140, which safe parameter sets have resulted in good, in particular the best, transmission properties in a particular period of time in the more recent past. These safe parameter sets SP can then be applied during critical transmission cycles during which successful transmission must take place in order to prevent the application from transitioning into an error state.

In order to evaluate the parameter sets PP, SP, the method furthermore comprises a step 260 of ascertaining a quality value for the applied parameter set PP, SP for a data exchange in a transmission cycle. The quality value describes the success of a data exchange. The higher a quality value is, the safer is a parameter set.

A quality value is, for example, dependent on one or more of the following characteristic variables:

a packet error probability (packet error ratio, PER), and/or a bit error probability (bit error ratio, BER), and/or signal-to-noise ratio (SNR), and/or an end-to-end latency between the transmitter and the receiver, and/or jitter It can advantageously be provided that the method 200 furthermore comprises: quantifying 260-1 an influence of a configuration on the communication system 100. A configuration of a data exchange can also affect the communication system 100 as a whole. One example is the spectral efficiency of the communication system 100, which in turn has an influence on the total data rate that can be transmitted in the communication system 100.

According to one embodiment, it is provided that the method 200 furthermore comprises a step 270 of assigning a parameter set to the first set 130-1 of parameter sets comprising parameter sets PP to be checked, or to the second set 130-2 of parameter sets comprising safe parameter sets SP. For example, an old parameter set that was applied a particular number of transmission cycles and/or a particular time duration ago but was classified as a safe parameter set a certain time ago can be removed from the second set 130-2 and assigned to the first set 130-1 after a certain time and/or a certain number of transmission cycles has elapsed. This is expedient for trying good configurations again and again and determining and, if necessary, updating their current communication quality. Furthermore, after successful data exchange, an applied parameter set to be checked can be classified as a safe parameter set and thus be added to the set 130-2.

According to one embodiment, it is provided that the method 200 comprises a step 280 of creating parameter sets PP to be checked, in particular new parameter sets. Creating can, in particular, comprise machine learning. New parameter sets are, for example, based on a variation of safe parameter sets SP.

Figure 3:
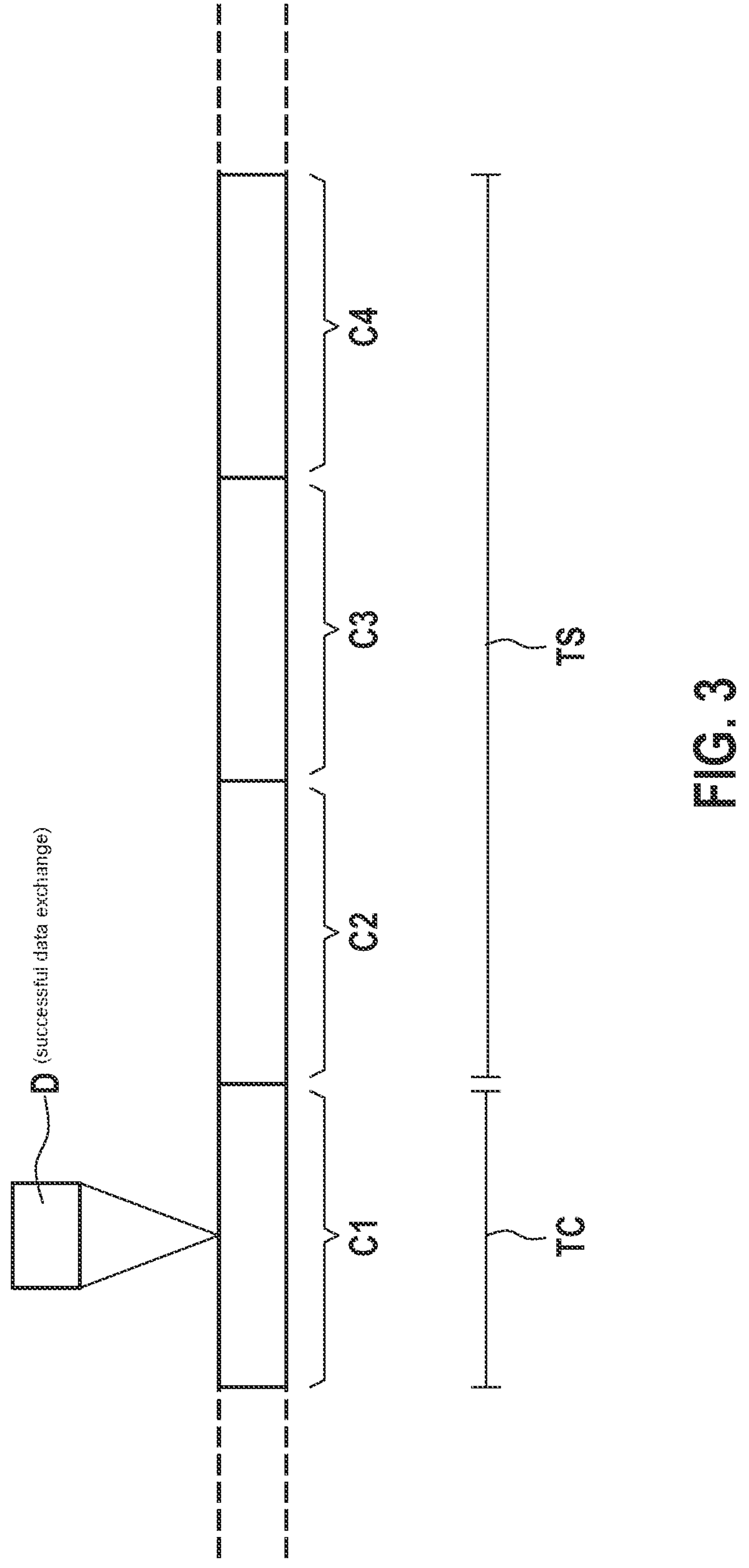
FIG. 3 shows a schematic representation of aspects of the communication system of FIG. 1 and of the method of FIG. 2, according to example embodiments of the present invention.

FIG. 3 shows a schematic representation of exemplary transmission cycles C1, C2, C3 and C4 of an application comprising, for example, communications between communication subscribers 110-1 and 110-2. The cycle time TC, i.e., the duration of a transmission cycle, is furthermore shown by way of example.

A successful data exchange D, for example between communication subscribers 110-1 and 110-2, is shown in the transmission cycle C1 by way of example.

According to the representation, the application comprises a survival time TS with three times the duration of a cycle time TC of a transmission cycle.

According to a simplified embodiment, the number of remaining non-critical transmission cycles can be ascertained based on the cycle time and the survival time TS.

For example, in this case, a number of M=3 non-critical transmission cycles can be determined with M=floor (TS/TC). Specifically, this means that a configuration according to the parameter sets PP to be checked can be selected in the transmission cycles C2, C3 and C4.

Parameter sets that are not necessarily among the most reliable parameter sets can thus be selected for three transmission cycles C2, C3, C4. Due to the survival time, faulty transmissions during the transmission cycles do not result in an error state of the application. After the three transmission cycles C2, C3, C4, a safe parameter set would then have to be selected again.

Alternatively, a number of M−1=3−1=2 non-critical transmission cycles may also be determined. In this case, additional certainty is achieved. Specifically, this means that a configuration according to the parameter sets PP to be checked can be selected in the transmission cycles C2 and C3. For the transmission cycle C4, a configuration according to a safe parameter set is selected.

In generalized terms, the parameter set optimization can thus be extended to M non-critical transmission cycles if the survival time corresponds to at least M times the cycle time. Alternatively, the last cycle before the survival time elapses can already be determined as a critical transmission cycle so that a number of M−1 non-critical transmission cycles results.

The invention claimed is:

1. A method for operating a communication system including at least two communication subscribers, wherein the at least two communication subscribers periodically exchange data with one another in transmission cycles, the method comprising the following steps:
- providing a first set of parameter sets including at least one parameter set to be checked, and providing a second set of parameter sets including at least one safe parameter set;
- ascertaining a number of remaining non-critical transmission cycles;
- selecting parameter sets to be checked from the first set of parameter sets for application in a respective non-critical transmission cycle, and selecting a safe parameter set from the second set of parameter sets for application in a critical transmission cycle; and
- applying a configuration according to a selected parameter set of the first set of parameter sets and the second set of parameter sets in a respective transmission cycle,
- wherein a parameter set to be checked is: (i) an old parameter set that was applied a particular number of transmission cycles and/or a particular time duration ago, or (ii) a new parameter set that has not yet been applied.

2. A method for operating a communication system including at least two communication subscribers, wherein the at least two communication subscribers periodically exchange data with one another in transmission cycles, the method comprising the following steps:
- providing a first set of parameter sets including at least one parameter set to be checked, and providing a second set of parameter sets including at least one safe parameter set;
- ascertaining a number of remaining non-critical transmission cycles;
- selecting parameter sets to be checked from the first set of parameter sets for application in a respective non-critical transmission cycle, and selecting a safe parameter set from the second set of parameter sets for application in a critical transmission cycle; and
- applying a configuration according to a selected parameter set of the first set of parameter sets and the second set of parameter sets in a respective transmission cycle,
- wherein the ascertaining of the number of remaining non-critical transmission cycles takes into account a survival time of a data exchange between the at least two communication subscribers.

3. The method according to claim 2, wherein a number of M or M−1 non-critical transmission cycles is ascertained for a survival time with M times a duration of a transmission cycle.

4. The method according to claim 1, further comprising:
- receiving information relating to the data exchange between the two communication subscribers and including at least one or more of the following items of information:
  - a cycle time, and/or
  - information about the at least two communication subscribers, and/or
  - a survival time, and/or
  - information about an amount of data.

5. The method according to claim 1, wherein parameters of each of the first and second parameter sets include parameters of one or more of the following characteristic variables:
- frequency channel/band, and/or
- modulation method, and/or
- transmission error correction encoding, and/or
- antenna configuration and/or antenna orientation, and/or
- transmit power, and/or
- beam forming properties, in particular lobe width and/or lobe direction, and/or
- redundant channels, and/or
- handover parameters.

6. The method according to claim 1, wherein a quality value for an applied parameter set is ascertained for a data exchange in a transmission cycle.

7. The method according to claim 6, wherein the quality value is dependent on one or more of the following characteristic variables:
- a packet error ratio (PER), and/or
- a bit error ratio (BER), and/or
- signal-to-noise ratio (SNR), and/or
- an end-to-end latency between a transmitter and a receiver, and/or jitter.

8. The method according to claim 1, further comprising:
- quantifying an influence of a configuration on the communication system.

9. The method according to claim 1, wherein the communication system includes more than two communication subscribers, and the number of remaining non-critical transmission cycles is ascertained based on a minimum subscriber-specific number of non-critical transmission cycles.

10. The method according to claim 1, wherein the selection of the parameter sets from the first and second parameter sets is based on a heuristic method or on a method including machine learning.

11. The method according to claim 1, wherein an applied parameter set together with a quality value of the applied parameter set is used for machine learning.

12. The method according to claim 1, further comprising:
- assigning a parameter set to the first set of parameter sets including parameter sets to be checked, or to the second set of parameter sets including safe parameter sets.

13. The method according to claim 1, further comprising:
- creating parameter sets to be checked including new parameter sets.

14. A device configured to operate a communication system including at least two communication subscribers, wherein the at least two communication subscribers periodically exchange data with one another in transmission cycles, wherein the device is configured to:

provide a first set of parameter sets including at least one parameter set to be checked, and provide a second set of parameter sets including at least one safe parameter set;

ascertain a number of remaining non-critical transmission cycles;

select parameter sets to be checked from the first set of parameter sets for application in a respective non-critical transmission cycle, and select a safe parameter set from the second set of parameter sets for application in a critical transmission cycle; and apply a configuration according to a selected parameter set of the first set of parameter sets and the second set of parameter sets in a respective transmission cycle, wherein a parameter set to be checked is: (i) an old parameter set that was applied a particular number of transmission cycles and/or a particular time duration ago, or (ii) a new parameter set that has not yet been applied.

* * * * *